N. PALMER.
Thrashing Machine.
No. 60,929.
Patented Jan'y 1, 1867.
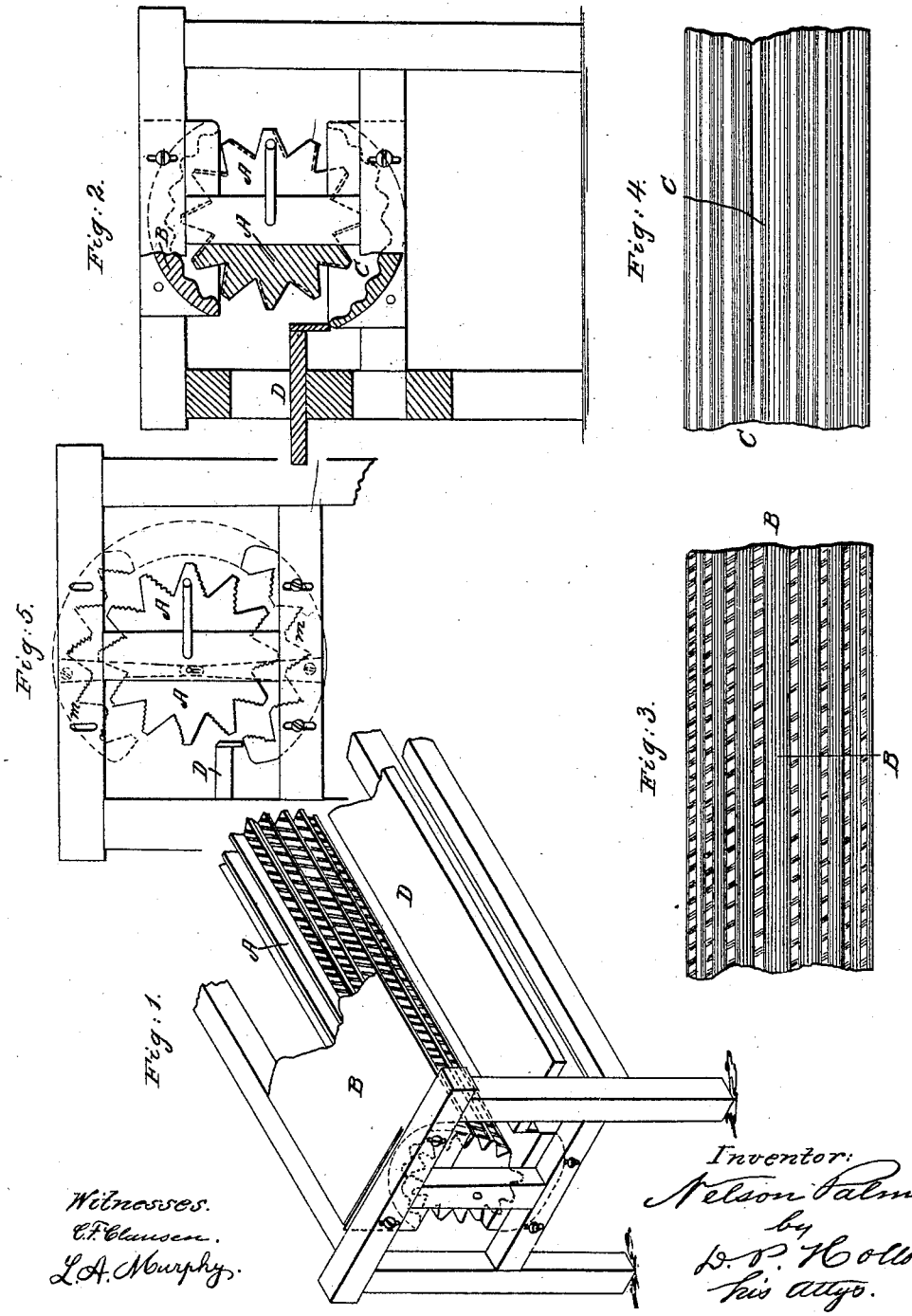

United States Patent Office.

NELSON PALMER, OF HUDSON, ASSIGNOR TO HIMSELF AND T. G. PALMER, OF SCHULTZVILLE, NEW YORK.

Letters Patent No. 60,929, dated January 1, 1867.

IMPROVEMENT IN THRESHING MACHINES.

The Schedule referred to in these Letters Patent and making part of the same.

TO ALL WHOM IT MAY CONCERN:

Be it known that I, NELSON PALMER, of Hudson, in the county of Columbia, and State of New York, have invented a new and useful Improvement in Threshing Machines; and I do hereby declare that the following is a full, clear, and exact description of the same, reference being had to the annexed drawings, making part of this specification, in which—

Figure I is a perspective view, part of the upper concave or rubber being broken away to show the threshing cylinder.

Figure II is a vertical transverse section, and partly an end view.

Figure III is an elevation of the rough concave or rubber.

Figure IV is an elevation of the smooth concave.

Figure V shows a variation in construction, to be hereafter described.

Figure VI.

In all the figures the same letters are used in the indication of identical parts.

My improvements are intended to be applied to that class of threshing machines in which the straw may be fed sideways to the machine, so as to enter with the length of the straw corresponding with the length of the threshing cylinder, and my invention consists in constructing the longitudinal ribs upon the threshing cylinder with the inclined faces upon one side thereof smooth, and the corresponding faces upon the opposite side thereof with diagonal or other corrugations. It is not essential to the successful operation of this machine that the straw be fed sideways, or parallel to the length of the threshing cylinder, for it may be fed in any other manner, when it is not desired to preserve the straw in a condition of parallelism for binding.

Second, in constructing the machine with two concaves, one placed below and the other above the threshing cylinder, the ribs of one being smooth, to correspond with the smooth faces on the ribs of the threshing cylinder, and the other with diagonal or other corrugations on the face of the ribs, with an inclination the reverse of those on the ribs of the threshing-machine cylinders.

Third, in the combination of the threshing cylinder with the opposite faces of the ribs, made, one smooth and the other corrugated, with rough and smooth-ribbed concaves, or with a single adjustable concave, having ribs, the faces of which are alternately smooth and corrugated; the said cylinder being so connected with the driving power that it may be revolved in either direction as desired.

The following description will enable a person skilled in the art to construct and use my improved threshing machine.

It is well known that in threshing grain from straw, the proper action of the machine depends upon the condition of the straw. If dry, the grain is easily detached from the heads, and the straw may be passed through the machine without being much broken or materially injured. If, however, the straw is wet, the grain is more difficult of removal, and requires a much rougher action in the machine. It is to accommodate the varying condition of the straw and grain that these changes have been intended.

A is the threshing cylinder, having longitudinal ribs, the faces of which are alternately smooth and corrugated. The cylinder is so connected with the driving power, that it may be revolved in either direction, and accordingly as it is operated in the one direction or the other, the smooth or the corrugated or otherwise roughened faces of the ribs will be presented to the concaves. B is the upper concave, the ribs of which have corrugated or otherwise roughened faces; the corrugations in both the cylinder and concave are diagonally disposed, but with reversed angles, so that they shall produce a shearing action by the motion of the cylinder across the face of the concave. When damp straw is to be passed through the machine, the cylinder is to be caused to revolve in such direction that the straw fed to it, upon the apron or feed-board D, shall be carried between the cylinder and the rough concave B; the corrugations upon the ribs of the cylinder being upon the faces presented to the rough concave in the revolution of the cylinder. On the other hand, when the grain and straw are dry, it is desirable to thresh the grain with the least possible injury to the straw, and in such case the threshing cylinder should be caused to revolve in the opposite direction, and carry the straw between the cylinder and the concave C placed below it, on which the ribs are constructed with smooth faces, the smooth faces of the ribs on the threshing cylinder being now presented to the smooth concave. In this action of the machine the straw is but little injured, and even in the case where damp straw is passed through the rough action, it is in much better condition than when threshed by toothed cylinders. The concaves are shown in the drawing and alluded to in the specification as being placed, respectively, above and below the threshing cylinder. These positions are, however, not essential; they may be placed in any positions that may be found to be convenient in reference to the other parts of the machine. I have heretofore described two concaves, one rough and the other smooth, on the faces of the ribs; but the same result may be obtained by a single concave, the ribs on which formed like those of the cylinder, smooth upon one side and rough upon the other, so that as the threshing cylinder revolved in one direction, the smooth faces of the ribs should be brought in opposition to the smooth faces of the ribs on the concave, and when revolved in the reverse direction the rough faces of the ribs on the concave should be brought in opposition to the rough faces of the ribs on the concave. Where a single concave is employed it should be made adjustable, so as to be placed above or below or on one side or the other of the cylinder, as desired. I have shown in fig. 5 one mode of making the concave adjustable, using straps on which it may swing one-half the circumference of the cylinder, as therein represented. Another mode of attaching the straps to the main frame is shown in fig. 6. All these modes I claim are the mere equivalents of one another, and so of other variations that might be constructed, containing the fundamental principle of my improvement, viz, providing for rough or smooth threshing, by a cylinder which, revolving in one direction, shall present smooth ribs to smooth on the concave; and, revolving in the other direction, shall present rough ribs to rough ribs on the concave. I have not particularly described the arrangement of the gearing for giving a reversed motion to the cylinder, as this may be done in many ways familiar to any skillful mechanic, by means of pulleys, with straight and crossed belts, or by gearing.

What I claim as my invention, and desire to secure by Letters Patent, is—

1. A threshing cylinder, when constructed with longitudinal ribs which are smooth upon one side and rough upon the other, substantially as and for the purpose set forth.

2. In a threshing machine the use of two ribbed concaves or rubbers, on one of which the ribs are smooth on their faces and on the other rough, substantially as and for the purpose set forth.

3. So constructing the concaves of threshing machines that the straw may, in the action of the machine, be brought into contact with either smooth or roughened ribs, or faces of ribs, as desired, substantially as and for the purpose set forth.

4. A threshing cylinder when so connected with the motive power and related to the concave or concaves, and other parts of the machine, that it may be operated revolving in either direction, substantially as set forth.

5. In combination with a threshing cylinder having ribs smooth upon one side and rough upon the other, I claim a ribbed concave or ribbed concaves, so constructed and arranged as to present smooth faces to the smooth faces of the threshing cylinder when revolving in one direction, and roughened faces to the rough faces on the ribs of the threshing cylinder, when revolving in the reverse direction, substantially as and for the purpose set forth.

In testimony whereof I have signed my name to this specification in the presence of two subscribing witnesses.

NELSON PALMER.

Witnesses:
   D. P. HOLLOWAY,
   T. G. PALMER.